(12) United States Patent
Radhakrishnan

(10) Patent No.: US 9,742,554 B2
(45) Date of Patent: Aug. 22, 2017

(54) SYSTEMS AND METHODS FOR DETECTING A SYNCHRONIZATION CODE WORD

(71) Applicant: Dolby Laboratories Licensing Corporation, San Francisco, CA (US)

(72) Inventor: Regunathan Radhakrishnan, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/765,563

(22) PCT Filed: Jan. 28, 2014

(86) PCT No.: PCT/US2014/013448
§ 371 (c)(1),
(2) Date: Aug. 3, 2015

(87) PCT Pub. No.: WO2014/120685
PCT Pub. Date: Aug. 7, 2014

(65) Prior Publication Data
US 2016/0006561 A1   Jan. 7, 2016

Related U.S. Application Data

(60) Provisional application No. 61/760,576, filed on Feb. 4, 2013.

(51) Int. Cl.
*H04L 7/04* (2006.01)
*G10L 19/018* (2013.01)

(52) U.S. Cl.
CPC ............ *H04L 7/042* (2013.01); *G10L 19/018* (2013.01)

(58) Field of Classification Search
CPC ......... H04L 7/042; H04L 7/046; H04L 7/041; H04L 7/04; H04L 7/033; H04L 7/08;
(Continued)

(56) References Cited

U.S. PATENT DOCUMENTS

| 5,822,360 A | 10/1998 | Lee |
| 6,035,177 A | 3/2000 | Moses |

(Continued)

FOREIGN PATENT DOCUMENTS

| EP | 1465354 | 10/2004 |
| WO | 2010/138006 | 12/2010 |

OTHER PUBLICATIONS

Gao, S. et al. "A Detection Algorithm of Audio Spread Spectrum Data Hiding" IEEE, 2008 4th International Conference on Wireless Communications, Networking and Mobile Computing, Oct. 12-14, 2008.

Wang, X. et al. "A New Adaptive Digital Audio Watermarking Based on Support Vector Regression" Audio, Speech, and Language Processing, IEEE Transactions, vol. 15, Issue 8, published in 2007, pp. 2270-2277.

(Continued)

*Primary Examiner* — Zewdu Kassa

(57) ABSTRACT

Systems and methods for detecting a synchronization code word embedded in a plurality of frames of a signal are described. In one example embodiment, the synchronization code word contains "s" bits, embedded one bit per frame in "s" frames of an input signal. The method of detecting this synchronization code word includes: initiating a first segmentation procedure wherein "n" segments are defined in each signal frame of the input signal. A first correlation threshold value, which is based on the synchronization code word, is used to identify in the "n" segments, a first segment having the highest likelihood of containing at least a portion of the synchronization code word. The first segment is used to initiate a recursive detection procedure incorporating one or more additional segmentation procedures and one or more additional correlation threshold values, to detect the synchronization code word in a sub-divided portion of the first segment.

26 Claims, 11 Drawing Sheets

(58) Field of Classification Search
CPC ....... H04L 7/0008; H04L 7/02; H04L 7/0331; H04L 7/0337; H04J 3/0608
USPC ................ 375/365, 362, 354, 316, 295, 219
See application file for complete search history.

(56) References Cited

U.S. PATENT DOCUMENTS

| | | | |
|---|---|---|---|
| 6,366,629 B1 | 4/2002 | Chen | |
| 6,792,542 B1 | 9/2004 | Lee | |
| 7,197,156 B1 | 3/2007 | Levy | |
| 7,796,978 B2 | 9/2010 | Jones | |
| 8,965,547 B2 | 2/2015 | Wabnik | |
| 8,989,885 B2 | 3/2015 | Wabnik | |
| 2004/0204943 A1 | 10/2004 | Kirovski | |
| 2005/0043830 A1 | 2/2005 | Lee | |
| 2005/0055214 A1* | 3/2005 | Kirovski | G10L 19/018 704/273 |
| 2005/0105726 A1 | 5/2005 | Neubauer | |
| 2006/0140314 A1 | 6/2006 | Kim | |
| 2006/0239503 A1 | 10/2006 | Petrovic | |
| 2008/0215333 A1 | 9/2008 | Tewfik | |
| 2008/0273707 A1 | 11/2008 | Kentish | |
| 2008/0275697 A1 | 11/2008 | Kentish | |
| 2010/0021003 A1* | 1/2010 | Baum | G10L 19/018 382/100 |
| 2014/0111701 A1 | 4/2014 | Radhakrishnan | |
| 2014/0129011 A1 | 5/2014 | Radhakrishnan | |

OTHER PUBLICATIONS

Kirbiz, s. et al "A Pattern Recognition Framework to Blind Audio Watermark" AEU-International Journal of Electronics and Communications, 2009, v. 63, No. 2 pp. 92-102, published in 2009.
Kraetzer, C. et al. "Pros and Cons of Mel-Cepstrum Based Audio Steganalysis Using SVM Classification" 9th International Workshop on Information Hiding, 2007.
Hernandez, J.J.G. et al. "Real-Time MCLT Audio Watermarking and Comparison of Several Whitening Methods in Receptor Side" 2006 8th IEEE International Symposium on Multimedia.
Sterling, M. et al. "An Adaptive Spread-Spectrum Data Hiding Technique for Digital Audio" 2005 IEEE International Conference on Acoustics, Speech, and Signal Processing.
Kirovski, D. et al "Spread-Spectrum Watermarking of Audio Signals" IEEE Transactions| on Signal Processing, vol. 51, No. 4, Apr. 2003.
He, X et al. "Efficiently Synchronized Spread-Spectrum Audio Watermarking with Improved Psychoacoustic Model" Research Letters in Signal Processing 2008.
Malik, H. et al "Robust Audio Watermarking Using Frequency Selective Spread Spectrum Theory" Proc. ICASSP 2004, Canada, May 2004.
Freund, Y. et al "A Short Introduction to Boosting" Journal of Japanese Society for Artificial Intelligence, pp. 771-780, Sep. 1999.
Swanson, M. et al "Robust Audio Watermarking Using Perceptual Masking" Signal Processing, vol. 66, Issue 3, May 28, 1998, pp. 337-355.

* cited by examiner

| | Bit at location 256 | Bit at location 512 | Bit at location 768 | Bit at location 1024 | Bit at location 1280 | Bit at location 1536 | Bit at location 1792 |
|---|---|---|---|---|---|---|---|
| Frame 1 | a1 | b1 | c1 | d1 | e1 | f1 | g1 |
| Frame 2 | a2 | b2 | c2 | d2 | e2 | f2 | g2 |
| Frame 3 | a3 | b3 | c3 | d3 | e3 | f3 | g3 |
| Frame 4 | a4 | b4 | c4 | d4 | e4 | f4 | g4 |
| Frame 5 | a5 | b5 | c5 | d5 | e5 | f5 | g5 |
| Frame 6 | a6 | b6 | c6 | d6 | e6 | f6 | g6 |
| Frame 7 | a7 | b7 | c7 | d7 | e7 | f7 | g7 |
| Frame 8 | a8 | b8 | c8 | d8 | e8 | f8 | g8 |
| Frame 9 | a9 | b9 | c9 | d9 | e9 | f9 | g9 |
| Frame 10 | a10 | b10 | c10 | d10 | e10 | f10 | g10 |
| Frame 11 | a11 | b11 | c11 | d11 | e11 | f11 | g11 |
| Frame 12 | a12 | b12 | c12 | d12 | e12 | f12 | g12 |

*FIG. 2B*

| sync_bit_pos | Option 1 | Option 3 |
|---|---|---|
| 0 | 0 | 0 |
| 1 | 5376 | 8960 |
| 2 | 10752 | 10752 |
| 3 | 16128 | 19712 |
| 4 | 21504 | 21504 |
| 5 | 26880 | 30464 |
| 6 | 32256 | 32256 |
| 7 | 37632 | 41216 |
| 8 | 43008 | 43008 |
| 9 | 48384 | 51968 |
| 10 | 53760 | 53760 |
| 11 | 59136 | 62720 |

*FIG. 4*

SYSTEMS AND METHODS FOR DETECTING A SYNCHRONIZATION CODE WORD

CROSS REFERENCE TO RELATED APPLICATIONS

This application claims priority to U.S. Provisional Application No. 61/760,576, filed on 4 Feb. 2013, which is incorporated by reference in its entirety.

The present application may be related to U.S. patent application Ser. No. 14/054,438 filed on 15 Oct. 2013 and U.S. patent application Ser. No. 14/066,366 filed on 29 Oct. 2013, both of which are incorporated herein by reference in their entirety.

TECHNICAL FIELD OF THE INVENTION

The present teachings relate to signals incorporating synchronization. In particular, some of the present teachings relate to systems and methods for detecting a synchronization code word embedded in one or more frames of a signal.

BACKGROUND OF THE INVENTION

Digital data is often transmitted from a transmitting end in a framing format wherein individual frames are identifiable on the basis of a unique combination of bits that is transmitted along with the digital data. The unique combination of bits is detected at a receiving end in order to synchronize the receiver to the transmitter and to correctly identify individual frames in the received signal for recovering the digital data carried in each individual frame.

Various techniques may be used at the receiving end to detect the unique combination of framing bits. However, many of the existing techniques suffer from one or more shortcomings. For example, in one prior art detection technique, each bit of the received signal contained in one or more frames of data is stored in a large buffer. The contents of this large buffer are then examined to detect the framing bits. As can be understood, not only does this technique necessitate a large buffer that adds to cost and complexity, but more significantly, the process results in a long delay as a result of the time that is needed to fill the large buffer prior to carrying out the detection.

It is therefore desirable to provide solutions that permit faster and more efficient detection of synchronization bits.

SUMMARY

According to a first aspect of the disclosure, a method of detecting a synchronization code word is disclosed. The synchronization code word contains "s" number of bits transmitted in a unique pre-defined sequence. The method includes selecting a first sampling rate "r1" that is based on partitioning each signal frame of the input signal into "n" segments; using the sampling rate "r1" to sequentially extract "n" candidate bits from each frame of "s" frames of the input signal; storing the "s*n" candidate bits in a first bit buffer; and using the stored s*n candidate bits to execute a first correlation-based detection procedure to identify a best-fit segment among the "n" segments. The first correlation-based detection procedure includes: computing a first set of correlation scores by comparing "n" number of s-bit combinations to the pre-defined synchronization code word; using the first set of correlation scores to select a first peak s-bit combination; and using the first peak s-bit combination to identify the first best-fit segment among the "n" segments.

The method further includes executing a segmentation-based detection procedure that is initiated from the first best-fit segment. The segmentation-based detection procedure includes: selecting a second sampling rate "r2" that is based on partitioning the first best-fit segment into "p" segments; using the second sampling rate "r2" to sequentially extract ("p−1") candidate bits from each frame of "s" frames of the input signal; storing the "s*(p−1)" candidate bits in a second bit buffer; and using the contents of the first and the second buffer to execute a second correlation-based detection to identify a second best-fit segment among the "p" sub-segments, wherein the second correlation-based detection procedure is substantially similar to the first correlation-based detection procedure. The method further includes using the second best-fit segment to initiate a recursive execution of the segmentation-based detection procedure to identify the synchronization code word amongst successively smaller portions of the second best-fit segment.

According to a second aspect of the disclosure, a method of detecting a synchronization code word is disclosed. The synchronization code word contains "s" bits, embedded one bit per frame in "s" frames of an input signal. The method includes: initiating a first segmentation procedure comprising defining of "n" segments in each signal frame of the input signal; using a first correlation threshold value based on the synchronization code word, to identify in the "n" segments, a first segment having the highest likelihood of containing at least a portion of the synchronization code word; and initiating from the first segment, a recursive detection procedure incorporating one or more additional segmentation procedures and one or more additional correlation threshold values, to detect the synchronization code word in a sub-divided portion of the first segment.

According to a third aspect of the disclosure, a computer-readable storage medium having stored thereon computer-executable instructions executable by a processor to detect a synchronization code word is disclosed. The synchronization code word contains "s" bits, embedded one bit per frame in "s" frames of an input signal. The detection includes: initiating a first segmentation procedure comprising defining of "n" segments in each signal frame of the input signal; using a first correlation threshold value based on the synchronization code word, to identify in the "n" segments, a first segment having the highest likelihood of containing at least a portion of the synchronization code word; and initiating from the first segment, a recursive detection procedure incorporating one or more additional segmentation procedures and one or more additional correlation threshold values, to detect the synchronization code word in a sub-divided portion of the first segment.

BRIEF DESCRIPTION OF THE DRAWINGS

FIG. 1 shows a communications system in accordance with the invention.

FIGS. 2A-C show several synchronization bit arrangements to describe an algorithm in accordance with the invention.

FIG. 4 shows a table containing a hopping schedule for a couple of options in accordance with the present disclosure.

DETAILED DESCRIPTION OF THE INVENTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that the description provided below is applicable to a wide variety of communication technologies. However, a couple of specific implementations are described herein solely as examples for the purpose of illustrating the concept in more detail rather than for indicating that the concept is limited to these few examples. These implementations pertain to watermarking, and more particularly to audio watermarking.

It will also be understood that certain words are used herein as a matter of convenience and should be interpreted accordingly in a broad and general sense. For example, it will be understood that the word "encoding" that is used herein can be equally well interpreted as "embedding" or "encrypting." Similarly, a "detecting" procedure can be alternatively recognized to be a "decoding" procedure. The alternative usage of such words will be understood by persons of ordinary skill in the art.

Figures 1, 2A:
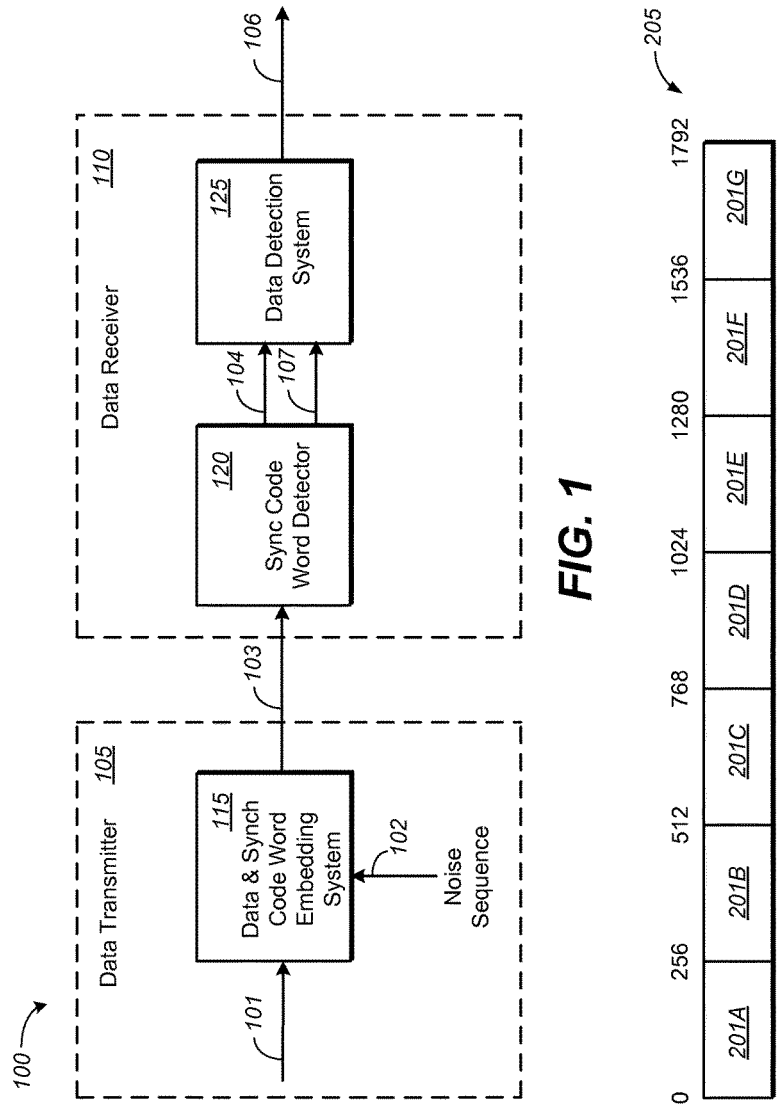

FIG. 1 shows a communications system (100) in accordance with the invention. System (100) includes a data transmitter (105) and a data receiver (110) incorporating a synchronization code word detector (120) that provides for fast detection and synchronization. It will be understood that several other elements which are contained in each of data transmitter (105) and a data receiver (110) are not shown in FIG. 1 so as to avoid obfuscation of certain primary aspects in accordance with the invention. Many of these several other elements are already known to persons of ordinary skill in the art, thereby rendering redundant, a description of such prior art elements. Furthermore, the various elements of data transmitter (105) and a data receiver (110) may be implemented in hardware, software, firmware or a combination thereof. When implemented in hardware, data transmitter (105) and a data receiver (110) may include a computer system as described below using FIG. 10.

Data transmitter (105) includes a data embedding system (115) that accepts information content to be transmitted out of data transmitter (105). A single link (101) is shown in FIG. 1 as providing the information content to data encoder system (115). However, it will be understood that the information content provided via link (101) may be very diverse in nature and may be generated in a variety of ways. For the sake of convenience, this information content will be referred to herein as including a payload and a synchronization code word.

The payload may be, for example, a number of audio signals that are derived from a plurality of sources, and when provided to data encoder system (115) are multiplexed using one or more of several multiplexing techniques, such as for example, time-division multiplexing or code division multiple access. The synchronization code word is then inserted into the multiplexed audio signal, for example, as a framing signal that can be used by data receiver (110) to identify each of the time slots contained in a time-division multiplexed signal received from data transmitter (105) via communications link (103) in the form of a data stream containing a sequence of frames.

In one embodiment, the payload includes a watermark. The watermark may be inserted in a variety of ways and a couple of examples are provided below that describe how a watermark can be encrypted into an audio signal.

Synchronization code word detector (120) contained in data receiver (110) processes the data stream in order to detect the synchronization code word in accordance with the invention. Once the synchronization code word is detected, synchronization code word detector (120) provides framing/synchronization information to data detection system (125) (via link (107)). The framing/synchronization information is used by data detection system (125) to extract the payload from the data stream that is received by data detection system (125) from synchronization code word detector (120) via link (104).

In one example embodiment, the payload is an audio signal with a watermark embedded inside. The embedding process, which is carried out by data embedding system (115) will be described below in more detail using a couple of specific implementations. However, at this time, the description will be primarily focused upon the operation of synchronization code word detector (120). It will be understood that the transmission format used for transmission over link (103) may be analog or digital in nature, and link (103) may be selected in accordance with the nature of the transmitted signal (for example, wire-line, wireless, optical etc.). When analog in nature, a front-end circuit (not shown) in data receiver (110) converts the analog signal into a stream of digital bits that is provided as an input signal to synchronization code word detector (120).

The audio signal with the watermark embedded inside is transmitted from data transmitter (105) to data receiver (110) in a frame format wherein each frame contains "N" bits (for example, 1792 bits). Along with the audio signal, a synchronization code word containing "s" bits (for example, 12 bits) is also transmitted from data transmitter (105) to data receiver (110) in every frame. The synchronization code word is recognizable by data receiver (110) on the basis of a prior understanding of the pattern used to characterize the synchronization code word, say, for example FFF(H). In one example embodiment, the synchronization code word is inserted once in every frame, whereas in another example embodiment, the synchronization code word is inserted multiple times into each frame. The number of times the insertion is carried out is referred to herein as a "repetition factor." Consequently, when the synchronization code word is inserted once in every frame, the repetition factor is equal to 1, whereas when inserted multiple times into each frame, the repetition factor is greater than 1 (say, for example, 3).

Synchronization code word detector (120), which may be implemented in hardware, software, firmware or a combination thereof, typically incorporates an algorithm that is described below in more detail. This algorithm provides several advantages over existing techniques that suffer from cost burdens and computational complexity. More particularly, a synchronization codeword, say of length "s" bits is inserted into "s" frames of a transmitted signal, wherein each frame contains 1 bit. At the receiving end, a synchronization codeword detector applies a brute force approach by processing every sample in the received signals to identify the "s" bits corresponding to the transmitted codeword, thereby resulting in a detecting rate of (N*s*). Here N represents the number of samples in one frame of the signal. As can be appreciated, this detecting rate tends to be higher when the repetition factor is greater than 1. The computational complexity of this approach when searching for the synchronization codeword is referred to as Out-of-Synch complexity. Once the synchronization codeword has been detected and the receiver is in synchronization with the transmitter, the detection rate may be reduced, thereby reducing an In-Synch computational complexity to a lower level than the Out-of-Synch complexity.

Figure 2C:
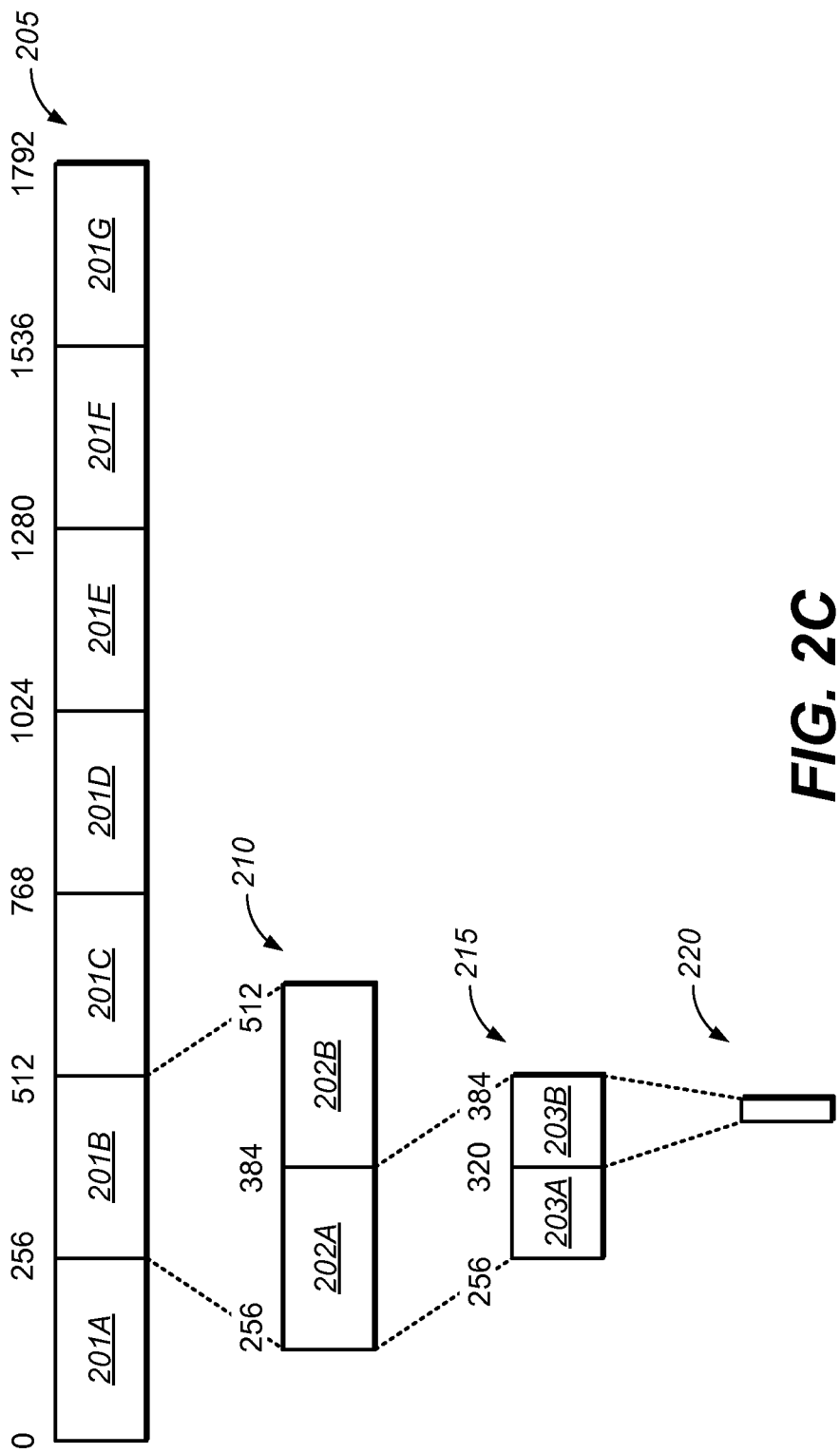

Attention is now drawn to FIGS. 2A-C, which show several bit arrangements to illustrate an algorithm in accordance with the invention. The algorithm incorporates a recursive correlation-based detection procedure that is applied in conjunction with a segmentation procedure. To elaborate upon this procedure, attention is first drawn to FIG. 2A, which shows an audio frame (205) that constitutes one frame containing "N" samples. Each "sample" may be formed of one or more bits. For example, in certain audio applications, a sample may contain 8 bits or 16 bits.

Irrespective of the number of bits contained in each sample, a synchronization code word (having a unique combination of "s" bits) is embedded inside "s" frames. In one example embodiment, this is implemented by transmitting one bit of the synchronization code word in one frame. Therefore, when the synchronization code word is 12 bits long, 12 frames are used to transmit the entire synchronization code word. An algorithm that is used to recover this synchronization code word in synchronization code detector (120) is described below in more detail, using for purposes of description, "N"=1792 samples and "s"=12 bits.

As pointed out above, each frame carries one bit of the synchronization code word. In contrast to prior art techniques wherein a brute force approach is used in the form of sampling every bit contained in audio frame (205), in accordance with this disclosure, a sampling rate "r1" is selected so as partition audio frame (205) into "n" segments and obtain "n" bits, each of which constitutes a potential candidate bit that is a part of the "s" bits of the synchronization code word.

In this example embodiment, the sampling rate is selected so as partition audio frame (205) into "7" segments. In other words, the sampling rate is selected so as sample audio frame (205) at every $256^{th}$ sample location, thereby partitioning audio frame (205) into 7 segments (201A-G) and obtaining 7 bits. One of the 7 bits obtained by this segmented sampling approach potentially constitutes one among the "s" bits of the synchronization code word.

Attention is now drawn to FIG. 2B, which shows a table (290) containing 7 bits sampled from each of 12 frames (corresponding to the 12 bits of the synchronization code word). The 84 bits shown in the table are stored in a buffer, and a processor (not shown) may be used to access these values from the buffer and use these bits as a starting point for further processing to accurately determine the exact location of the synchronization code word (vis-à-vis the frame boundary delineated by samples 0 and 1792 of each frame).

Each of the rows of table (290) shows the 7 bits sampled from the respective frames at the $256^{th}$, $512^{th}$, $768^{th}$ . . . $1792^{nd}$ locations of the frame. Specifically, the first row indicates 7 bits ("a1" through "g1") extracted from frame 1, the second row indicates 7 bits ("a2" through "g2") extracted from frame 2 and so on. Each column (226-232) of table (290) indicates 12-bit combinations that potentially correspond to the synchronization code word. Specifically, the first column (226) shows bits "a1" through "a12" that may constitute the synchronization code word. Similarly, the second column (227) shows bits "b1" through "b12" that may also constitute the synchronization code word. As can be understood, there is a statistical low probability that one of the seven 12-bit combinations indicated by the 7 columns (226-232) of table (290) is an exact match to the synchronization code word. Consequently, in accordance with the algorithm, a correlation value is obtained for each of the seven 12-bit combinations by matching each of the combinations against the synchronization code word. Some of the combinations may contain more number of bits matching at least a portion of the synchronization code word, while some may have fewer or none that match even a portion of the synchronization code word. A threshold score is used to disregard combinations that have an unacceptable level of correlation. Among those exceeding the threshold score, the 12-bit combination that has the highest correlation is identified. For example, let it be assumed that the 12-bit combination shown in column 227 (corresponding to location 512) has the highest correlation.

Based on this assumption, attention is now drawn to FIG. 2C. The correlation scores of the 12-bit samples obtained at the $256^{th}$ and $768^{th}$ locations, which are located on either side of the $512^{th}$ location, are then compared against each other. The higher of the two scores is used to select a sub-segment so as to refine the search and identify a more precise location having the best match to the synchronization code word inside sequence (205).

Let it be assumed that the correlation score of the sample obtained at the $256^{th}$ location is higher than that obtained from the $768^{th}$ location. Under this condition, segment (201B) is selected as a best-fit segment and used thereon as a basis for identifying the more precise location.

Upon identifying segment (201B) as the best-fit segment, another sampling rate "r2" is selected so as partition segment (201B) into "p" segments. In this example embodiment, the sampling rate "r2" is selected to partition segment (201B) into two parts. The procedure described above using table (290) is repeated using these 2 sub-segments (in place of the seven segments that were used in sequence (205)) so as to obtain 12-bit values at location 384 over 12 frames. The 12-bit values are again processed (using the correlation scores and threshold score procedure described above) so as to identify a second peak correlation score. This processing includes the use of the correlation scores previously determined for the $256^{th}$ and $512^{th}$ locations. More particularly, the correlation score for the 12-bit sample at location 384 is compared to those at locations 256 and 512 so as to determine which of the two sub-segments 202A and 202B has a higher likelihood of containing the synchronization code word.

Let it be assumed that the result of this comparison indicates that sub-segment (202A) is the best-fit sub-segment. Segment (202A) is then used to initiate a recursive execution of the segmentation-based detection procedure to identify additional peak matches amongst successively smaller portions. The recursive operation action can be understood from recognizing that portions (203A) and (203B) are identified from sub-segment (202A), and portion (220) is identified from portion (203B). Though FIG. 2 shows only two additional steps conducted using sub-segment (202A), it should be understood that this level of granularity is indicated solely for purposes of description, and in various other embodiments, fewer or more number of steps may be executed using portion (220A) as a starting point. Furthermore, the sampling rates selected for each level does not necessarily have to be equal to each other.

Portion (220) represents a final best-fit result that matches the synchronization code word. In the optimal case, portion (220) is a 12-bit word that is either an exact match or has a large number of bits matching an equivalent number of bits in the synchronization code word.

It will be understood from the description above that the selection of the threshold score is significant because a low value may lead to an undesirable number of correlation scores exceeding the threshold score, whereas a high value may result in too few or no correlation scores being deemed acceptable. It will also be understood that the algorithm as described above is applied when only one bit of the synchronization code word is carried in one frame. However, in some embodiments, the one bit may be replicated more than once within each frame (repetition rate >1) so as to better facilitate synchronization. However, in certain embodiments, only one bit per frame may be used when searching for the synchronization code word prior to achieving synchronization (out-of-synch procedure). Once synchronization has been achieved an in-synch procedure may be implemented that uses more than one bit per frame (in-synch procedure) to maintain synchronization. The out-of-sync procedure has a detection complexity that can be characterized as being equal to n*s times the complexity of the in-synch detection procedure.

Figure 3:
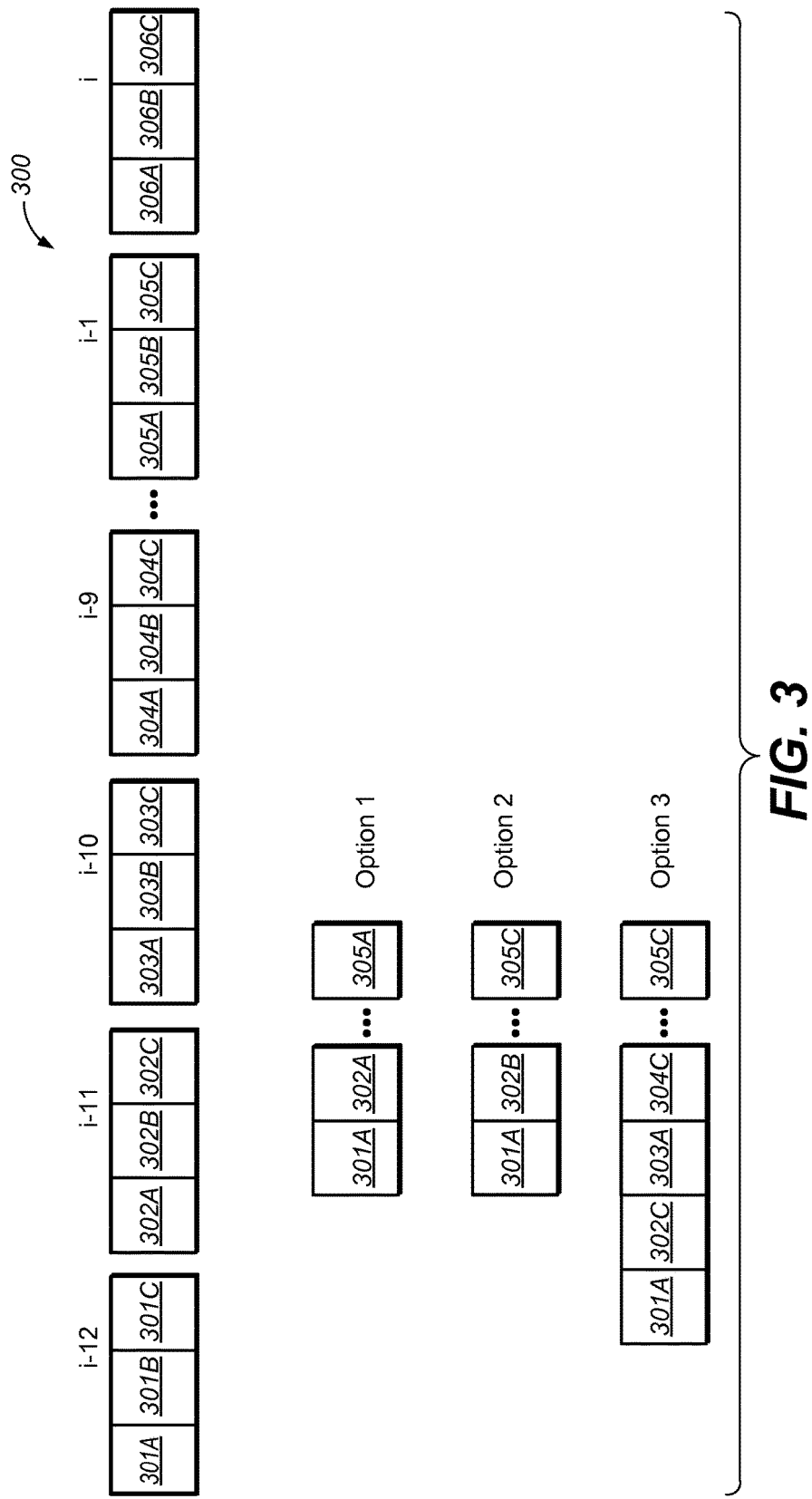
FIG. 3 shows a table indicating a hopping schedule that can be utilized for carrying out detection of a synchronization code word when the repetition factor is greater than 1.

Attention is next drawn to FIG. 3, which shows a table indicating a hopping schedule that can be utilized for carrying out detection of a synchronization code word when the repetition factor is greater than 1. In the example embodiment described using FIG. 3, the repetition factor is 3. The first occurrence is indicated by an "A" suffix, the second by a "B" suffix and the third by a "C" suffix.

As indcted above, out-of-synch detection is typically based on a single frame. Consequently, when the repetition factor is 3, any one of the three occurrences is selected for out-of-synch detection. For example, each of the bits with a similar suffix (say, "A" suffix) is used. For carrying out in-synch detection, it is desirable that the correlation score be maximized over all 36 instances that are shown in sequence (300). However, the correlation score in this example is based on a subset of 12, which can be selected using three different options. In option 1, the hopping size is selected to be equal to repetition factor*frame size, which corresponds to 3*1792 in this example embodiment. With this option, a larger correlation score can be obtained even if the alignment is off by one or two frames.

In option 2, the first occurrence of the first bit is combined with the second occurrence of the second bit and the third occurrence of the third bit (indicated by the labels 301A, 302B and 305C). This pattern is repeated 4 times to assemble all 36 bits in a bit buffer.

In option 3, the first occurrence of the first bit is combined with the third occurrence of the second bit (301A, 302C) and this pattern is repeated 6 times to assemble all 36 bits in a bit buffer. As can be understood, the correlation scores using options 2 and 3 have a maximum value only when the alignment of the bits is accurate.

FIG. 4 shows a table containing a hopping schedule for options 1 and 3 described above.

Figure 5:
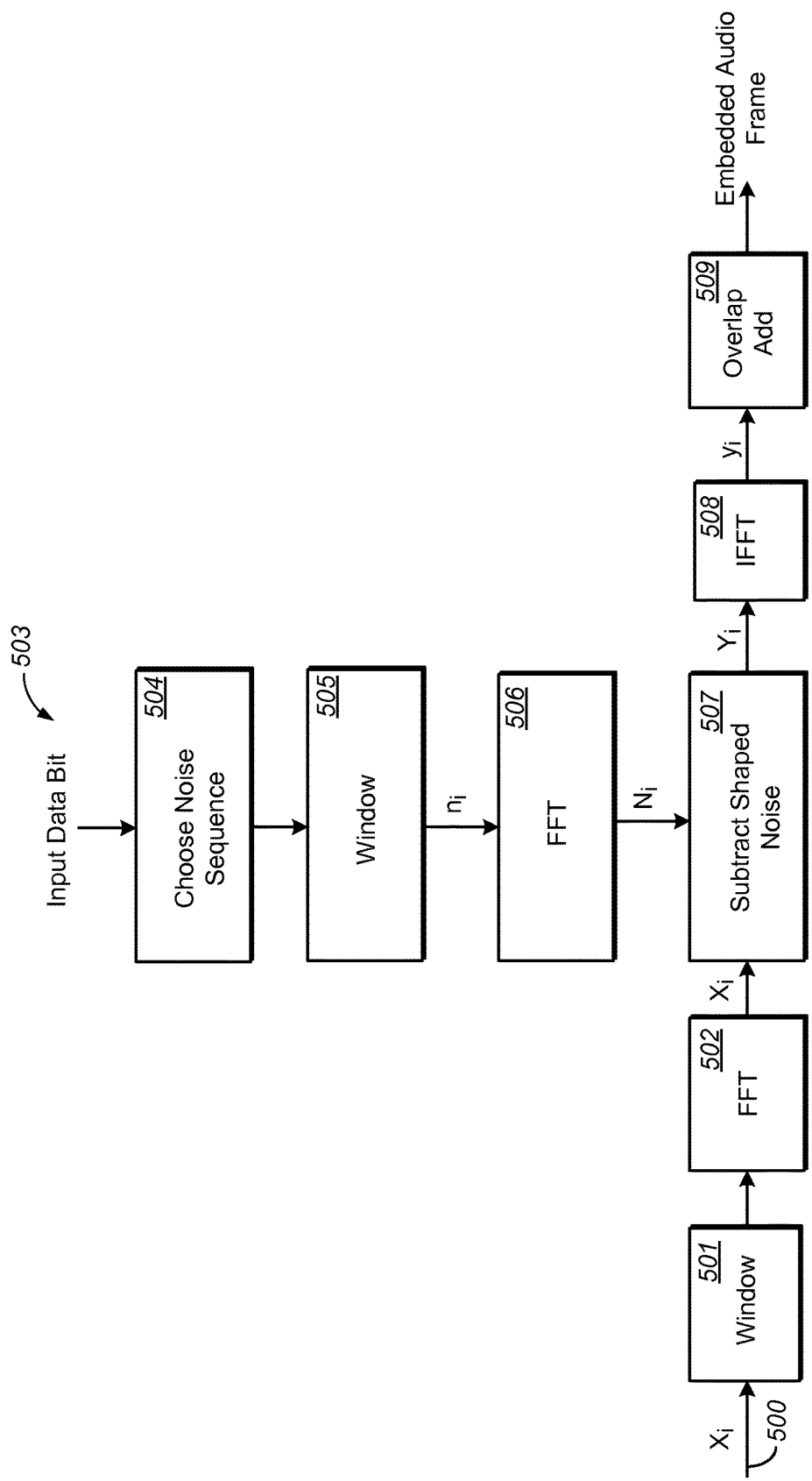
FIG. 5 shows a block diagram of a computer- or processor-based spread spectrum embedding method for an input audio data in accordance with one embodiment of the present disclosure.

FIG. 5 shows a block diagram of a computer- or processor-based spread spectrum embedding method for an input audio data in accordance with an embodiment the present disclosure. In accordance with the embodiment of FIG. 5, the data embedding method shapes a noise sequence using a spectrum of the input audio signal. The method or system of FIG. 5 is a computer- or processor-based method or system. Consequently, it will be understood that the functional blocks shown in FIG. 5 as well as in several other figures can be implemented in a computer system as is described below using FIG. 10.

The input audio signal (500) is initially divided into frames each having a length of N samples (e.g. 2048 samples). Each frame can be represented as x, while a time domain representation of frame i can be represented as $x_i$. Therefore, one skilled in the art will understand that although a frame of length 2048 samples is provided in the present embodiment, other possible frame lengths could be used as well.

After the input audio signal (500) is divided into frames, each input audio signal frame is then multiplied by a window function (501). This window function acts as a mathematical function that is zero-valued outside of a chosen interval and retains the samples that are within the chosen interval.

In a further step of the data embedding method shown in FIG. 5, a fast Fourier transform (FFT) is applied (502) to each frame to obtain a frequency domain representation $X_i$. In alternative embodiments, other types of transforms may be used.

In accordance with the method of FIG. 5, noise sequence generation is also performed. For example, two noise sequences $n_0$ and $n_1$, are generated, each noise sequence being used to represent one bit of data (503). In other words, if sequence $n_0$ is used a zero bit is to be embedded in the audio frame, while sequence $n_1$ is used if a one bit is to be embedded in the audio frame. The noise sequences can be shaped so that only some of their values in a frequency representation are different from zero. By way of example, the frequency coefficients (or "bins") carrying noise information of frequency representations $N_0$ and $N_1$ of $n_0$ and $n_1$ respectively, can be in a 2 to 7.5 kHz range, as human hearing is sensitive in such range. More generally, information carrying coefficients can be chosen in a 20 Hz to 20 kHz range, to ensure watermark robustness. Therefore, assuming that the frequency representation of $n_0$ and $n_1$ is $N_0(k)$ for $1 \leq k \leq N$ and $N_1(k)$ for $1 \leq k \leq N$, respectively, where N is the number of samples of each noise sequence corresponding to the number of samples N of each frame $X_i$ (e.g., N=2048), the coefficients k are so chosen that $N_0(k)=0$ for $1 \leq k \leq m$ and $m+L+1 \leq k \leq N$, and $N_1(k)=0$ for $1 \leq k \leq m$ and $m+L+1 \leq k \leq N$ while $N_0(k)$ and $N_1(k) \neq 0$ for the L coefficients having indices in the $\{m+1 \ldots m+L\}$ range, such range corresponding to the selected frequency range of interest (e.g. 2 kHz to 7.5 kHz).

In accordance with an embodiment of the present disclosure, each of the L frequency coefficients of $N_0(k)$ or $N_1(k)$ is modified to encode a chip from a chip sequence for embedding either a zero (identified as $W^0$) or a one (identified as $W^1$). In other words, $W^0$ and $W^1$ represent pseudo-random chip sequences of $\{+1, -1\}$ used to embed a zero or one, respectively.

More in particular, sequence $N_0$ can be defined as follows:

$$N_0(k) = 1 - g \quad \text{if } W^0(k - m) = 1$$
$$= 1 - \frac{1}{g} \quad \text{if } W^0(k - m) = -1$$

Here, k represents indices of selected frequency coefficients with the range $\{m+1, m+2, \ldots, m+L\}$. A g parameter relates to a gain modification within the chosen frequency range (e.g. between 2 kHz and 7.5 kHz). g can be defined by $g^2=10^{(\Delta/10)}$ where $\Delta$ is expressed in dB and is usually equal to 1 dB. Furthermore, as already noted above, $N_0(k)=0$ for $1 \leq k \leq m$ and $m+L+1 \leq k \leq N$.

Similarly, $N_1$ can be defined as follows:

$$N_0(k) = 1 - g \quad \text{if } W^1(k - m) = 1$$
$$= 1 - \frac{1}{g} \quad \text{if } W^1(k - m) = -1$$

Also in this case, k represents indices of the selected frequency coefficients with the range $\{m+1, m+2, \ldots m+L\}$. g is the same parameter as defined above, which is the gain modification at frequencies within the chosen frequency range. Furthermore, $N_1(k)=0$ for $1 \leq k \leq m$ and $m+L+1 \leq k \leq N$.

After $N_0$ and $N_1$ are formed, an inverse Fourier transform is performed. As a result of the inverse Fourier transformation, the time domain representation of the two noise sequences $N_0$ and $N_1$ ($n_0$ and $n_1$) are obtained. The process for generating the two noise sequences to represent input data bit 0 or input data bit 1 can be done once offline, if desired and is generally represented by box (504). Such sequences are then multiplied by a window function (505) and transformed (506) similarly to what was performed in blocks/steps (501) and (502) for the input audio signal, thus generating a noise sequence $N_i$ adapted to embed information related to a 0 input data bit or 1 input data bit into each sample within a selected frequency range of an audio frame $X_i$.

As a consequence, in block (507) of FIG. 5, a modified frame i (identified as $Y_i$) is obtained through the combination of audio data frame $X_i$ (in the frequency domain) and noise $N_i$ containing information about a data bit $d_i=0, 1$. In particular, with reference to FIG. 5, $Y_i$ can be identified as follows:

$Y_i = X_i - X_i \cdot *\text{FFT}(\text{tukey\_win.}*n_0)$ if $d_i=0$, where FFT $(\text{tukey\_win.}*n_0)=N_0$ $Y_i = X_i - X_i \cdot *\text{FFT}(\text{tukey\_win.}*n_1)$ if $d_i=0$, where FFT $(\text{tukey\_win.}*n_1)=N_1$ and where .* represents point-wise multiplication of two vectors.

In other words, the noise sequence ($n_0$ or $n_1$) at the output of block (504) is chosen according to the data bit ($d_i$) (the input (503)) to be embedded in a particular frame. Then, a chosen noise sequence undergoes a window function (505) (e.g. a tukey window) and further transformed (506) (e.g. using a fast Fourier transformation (FFT)). The end result is a transform domain representation $N_i$ of the noise sequence which is shaped in accordance with the equations above using the audio frame's spectrum $X_i$. As shown in the above equations, the transform domain representation of the noise sequence shaped using the audio frame's spectrum is subtracted from the audio frame's spectrum. As described above, in an embodiment of the present disclosure, such subtraction only occurs in a specific frequency subrange of the audio frame.

Therefore, in accordance with the present disclosure, the noise sequence is shaped using the spectrum of the audio signal.

In an embodiment of the diagram shown in FIG. 5, a way to later improve detection accuracy at a detector could be implemented by using a repetition of a same data bit $d_i$ for a number of consecutive frames as described above (repetition factor). For example, when the repetition factor can be a value of three, the data bit $d_i$ is repeated three times (or a corresponding noise sequence is repeated three times). However, with the added robustness of the signal at the detector, a tradeoff can occur with the embedding bit rate (number of embedded data bits per second of audio), which would decrease as a function of the chosen repetition factor.

In a further step of the method shown in FIG. 5, an inverse Fourier transformation (508) is performed on the frequency domain modified frame $Y_i$ in order to obtain a time domain modified frame $y_i$. Additionally, time overlapping and adding of the samples are performed in block/step (509), thus obtaining a plurality of embedded/watermarked time domain audio frames. FIG. 5 also shows an optional overlap adding module (509). Since in the embodiment of FIG. 5 frame $y_{i-1}$ and frame $y_i$ are both multiplied by the same window function (e.g. a tukey window), the trailing part of frame $y_{i-1}$'s window function overlaps with the starting part of the frame $y_i$'s window function. Since the window function is designed in such a way that the trailing part and the starting part add up to 1.0, the overlap add procedure of block (509) provides perfect reconstruction for the overlapping section of frame $y_{i-1}$ and frame $y_i$, assuming that both frames are not modified.

Reference will now be made to the diagram of FIG. 6, which shows a data detection operational sequence that may be implemented in hardware, software, or a combination thereof, in accordance with an embodiment of the disclosure, where a detection decision as to which data is embedded in the audio signal is performed by comparing detection scores calculated from a set of competing statistical learning models. The description of the embodiment of FIG. 6 will assume frame alignment between embedding and detection. Otherwise, a synchronization step can be used before performing the detection to ensure that alignment is satisfied. Several synchronization methods are known in the art and will not be elaborated upon herein.

Figure 6:
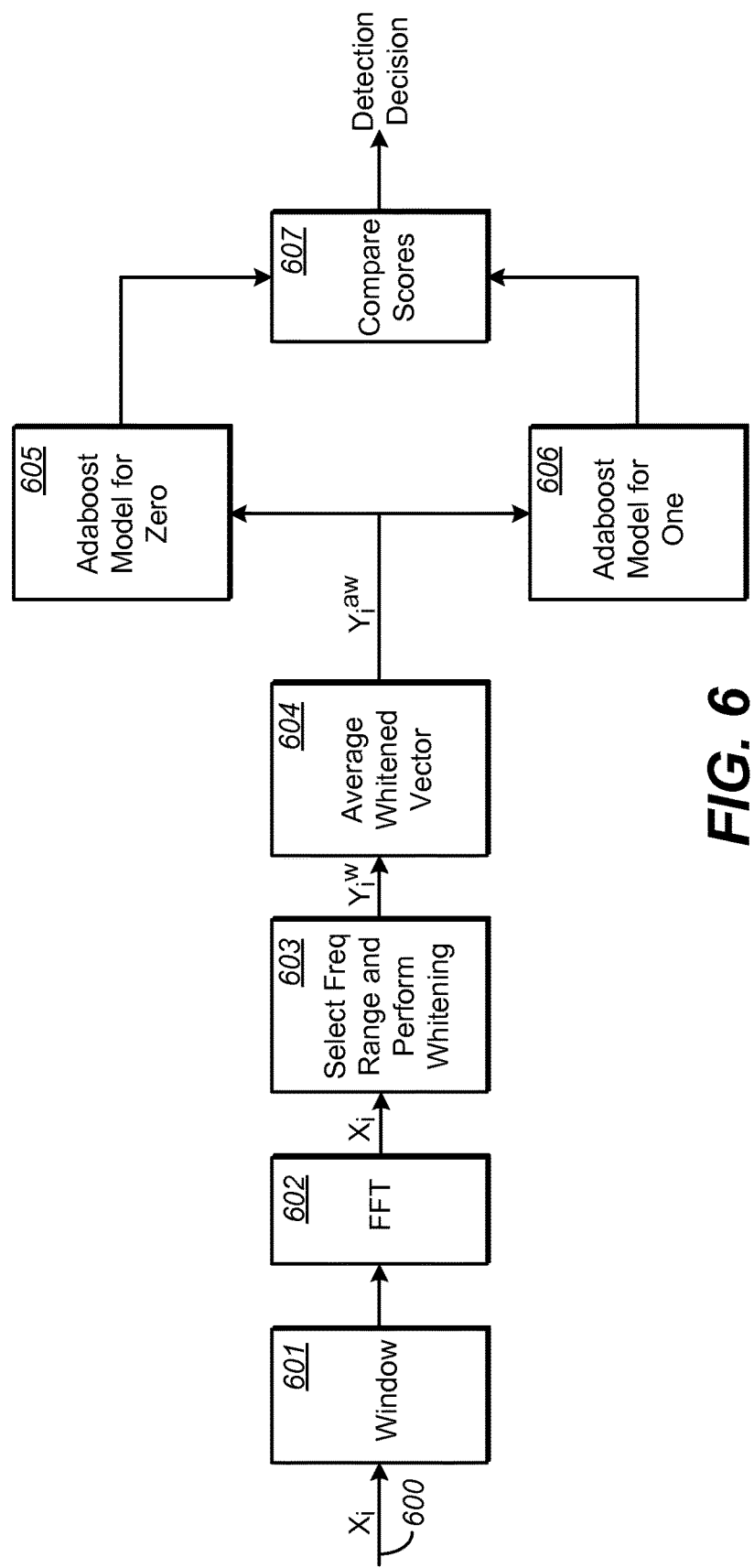
FIG. 6 shows a data detection operational sequence that may be implemented in in accordance with one embodiment of the disclosure.

As shown in FIG. 6, watermarked input audio signal frames $y_i$ (600) are received at the detector. As already noted with reference to the embedding embodiment of FIG. 5, the particular frame length (e.g. 2048 samples) can be chosen based on preference. The input audio frames are then multiplied by a window function (601) and transformed (602).

In a further step of the detection method (603), frequency coefficients of the transformed signal $Y_i$ are chosen within a range, in compliance with the frequency range adopted in FIG. 5. For example such range can be between 2 kHz and 7.5 kHz, corresponding to selected frequency coefficients, which can be identified as $\{Y_i^{m+1}, Y_i^{m+2}, \ldots, Y_i^{m+L}\}$.

In order to perform detection without using the original signal $X_i$ (also called blind detection), and to reduce a noise interference of a host signal in a detection statistic, the detection method of FIG. 6 can perform a whitening step of the spectrum in the above selected frequency range. Spectral whitening can be performed, for example using cepstral filtering, where DCT is a discrete cosine transform:

$$Z_i = DCT(10 * \log 10(|Y_i|^2))$$

After whitening is performed, the output $Z_i$ has same dimensions as the selected frequency range $Y_i$ but only a top number of coefficients in $Z_i$ is retained, while the other coefficients of $Z_i$ are zeroed out. The frequency signal obtained, keeping the top number of coefficient and zeroing out the other coefficients is identified as $Z_i^f$.

By performing an inverse DCT of $Z_i^f$, the detection method is able to obtain a whitened signal $Y_i$ (identified as $Y_i^w$) at the output of block (603). In an embodiment of the present disclosure, the top number of coefficients to be retained can be 18.

It should be noted that other types of filtering, besides cepstral filtering could be used to obtain a whitened spectrum. For example, a high-pass filter or a moving average whitening filter could be used as well. A moving average whitening filter computes the mean value around a window of the current sample and subtracts the computed mean from that sample. The window is moved to the next sample and the process is repeated again.

Turning now to FIG. 6, a feature is computed (604) that corresponds to averages of the whitened spectrum ($Y_i^w$) over a number of frames that is equal to the repetition_factor as shown below:

$$Y_i^{aw} = (1/\text{repetition\_factor}) \Sigma Y_j^w, \text{ where}$$
$$j = i, i+1, \ldots, (i + \text{repetition-factor} - 1),$$

where signal $Y_i^{aw}$ represents the output of block (604).

Reference will now be made to steps/blocks (605)-(607), which show an AdaBoost-based method in accordance with the embodiment of FIG. 6. In other words, detection scores are calculated from a set of competing statistical learning models, and a detection decision as to which data is embedded in the audio signal is performed by comparing the calculated detection scores.

The AdaBoost algorithm calls a given "weak or base learning algorithm" repeatedly in a series of rounds t= 1, 2, ... T. One of the main concepts behind the algorithm is to maintain a distribution or set of weights. Initially, all weights are set equally but on each round, the weights of incorrectly classified examples are increased. In particular, the detecting method scores can be computed as follows:

$$H_0(Y_i^{aw}) = \text{sign}(\Sigma a_{t,0} h_{t,0}(Y_i^{aw}))$$

$$H_1(Y_i^{aw}) = \text{sign}(\Sigma a_{t,1} h_{t,1}(Y_i^{aw}))$$

where t=1, 2, ... T, and where $H_0(Y_i^{aw})$ (605) is a model score for detecting a zero bit, while $H_1(Y_i^{aw})$ (606) is a model score for detecting a one bit. Comparison of the two model scores (for detecting a zero bit and a one bit) is then performed (607). If $H_0(Y_i^{aw}) > H_1(Y_i^{aw})$, then a detected bit is zero. Otherwise, if $H_0(Y_i^{aw}) < H_1(Y_i^{aw})$, then the detected bit is one.

The parameters of the model score for zero are $\alpha_{t,0}$, $h_{t,0}(Y_i^{aw})$ and T. In the embodiment of FIG. 6, $h_{t,0}(Y_i^{aw})$ represents a weak classifier that detects a zero bit with a probability of accurate detection which is slightly better than random (>0.5). $\alpha_{t,0}$ is a weight associated with the $t^{th}$ weak classifier of $h_{t,0}(Y_i^{aw})$. T is a total number of weak classifiers whose decisions are combined to derive a score for a final strong model for zero bit (classifier). Similarly, $\alpha_{t,1}$, $h_{t,1}(Y_i^{aw})$ and T represent model parameters for the model score to detect a one bit.

In an embodiment of the present disclosure, model parameters can be determined through an off-line training procedure. For example, given a set of labeled training data (e.g. embedding frames where a 0 bit was embedded or frames without any embedding), the off-line training procedure combines decisions of a set of weak classifiers to arrive at a stronger classifier. A weak classifier (e.g. decision stump) may not have high classification accuracy (e.g. >0.9), but the weak classifier's classification accuracy can be at least >0.5.

For example, a feature vector $Y_i^{aw}$ can compare one element (energy in a particular frequency coefficient or "bin") to a threshold and predict whether a zero was embedded or not. Then, by using the off-line training procedure, the weak classifiers can be combined to obtain a strong classifier with a high accuracy. While learning a final strong classifier, the off-line training procedure also determines a relative significance of each of the weak classifiers through weights ($\alpha_{t,1}$, $\alpha_{t,0}$). So, if the weak classifiers are decisions stumps based on energy in each frequency bin in a whitened averaged spectrum ($Y_i^{aw}$), then a learned off-line training model also determine which frequency components are more significant than others.

An off-line training framework can be formulated as follows. Given a set of training data with features (such as whitened averaged spectral vectors) derived from frames consisting of different types of training examples; for example two different types where a zero or one bit was embedded and examples where there was no data bit embedded.

For an embodiment of the present disclosure, a feature vector can be represented for frame "i" as $Y_i^{aw}$, (with a L dimensional feature vector where i=1, 2, ... M). Also a label $X_i$ can be used in each example indicating whether a zero or one bit was embedded or if no bit was embedded. For example, $X_i = +1$ can be used when a zero or one was embedded while $X_i = -1$ can be used if no bit was embedded.

Furthermore, a number of weak classifiers can be identified as $h_{t,0}$ (t=1, 2, ... T). Each $h_{t,0}$ maps an input feature vector ($Y_i^{aw}$) to a label ($X_i$). Also a predicted label $X_{i,t,0}$ by the weak classifier ($h_{t,0}$) matches a correct ground truth label $X_i$ at least more than 50% of an M number of training instances.

With a given training data, a learning algorithm selects a number of weak classifiers and learns a set of weights $\alpha_{t,0}$ corresponding to each of the weak classifiers. A strong classifier, $H_0(Y_i^{aw})$ can be expressed as in the equation below:

$$H_0(Y_i^{aw}) = \text{sign}(\pi \alpha_{t,0} h_{t,0}(Y_i^{aw}))$$

Figure 7:
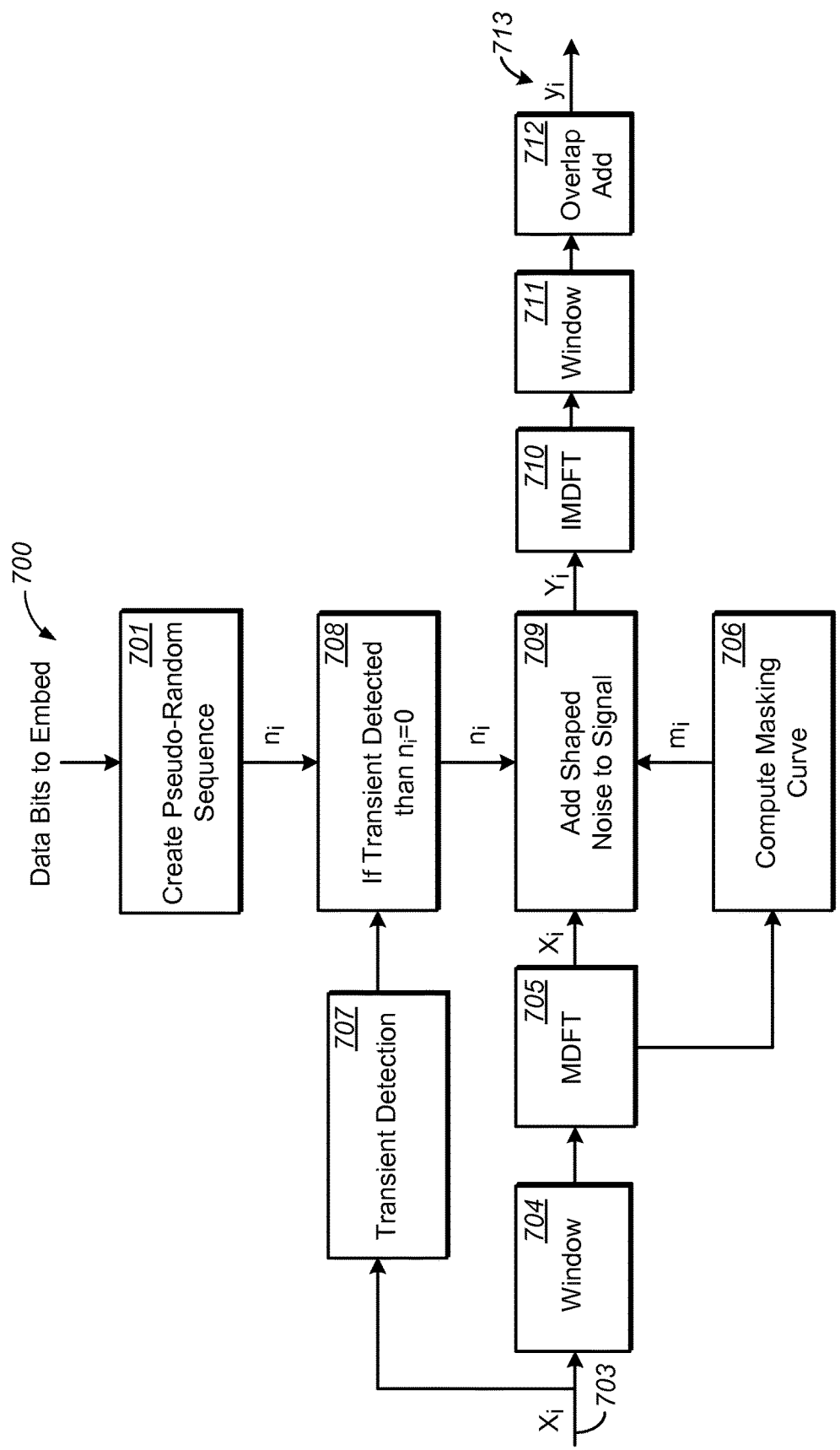
FIG. 7 shows some functional blocks for implementing embedding for spread spectrum audio data hiding and efficient detection in accordance with another embodiment of the present disclosure.

FIG. 7 shows some functional blocks for implementing embedding for spread spectrum audio data hiding and efficient detection in accordance with an embodiment of the present disclosure. The method, operational sequence or system of FIG. 7 is a computer- or processor-based method or system. Consequently, it will be understood that the functional blocks shown in FIG. 7 as well as in several other figures can be implemented in a computer system as is described below using FIG. 10.

In the embodiment of FIG. 7, pseudo-random noise sequences are created to represent a plurality of data bits (700) to embed in an input audio signal. A pseudo-random noise sequence (701) is then created by concatenating noise sequences from a set of such pseudo-random sequences. For example, pseudo-random noise sequence n is formed by concatenating an L number of pseudo-random sequences {n0, n1, ... nL−1}.

Each noise sequence in the set of pseudo-random sequences represents $\log_2 L$ bits of the data bits to embed in the audio signal. For example, one data bit can be represented using two noise sequences: $n_0$ and $n_1$. If an input data bit sequence to be embedded in the audio signal is 0001, then the input data bit sequence can be represented as $n_0 n_0 n_0 n_1$ where $n_0=0$ and $n_1=1$. On the other hand, if each noise sequence represents two data bits, then the same input data bit sequence above can be represented by $n_0 n_1$ by using four noise sequences $n_0$ to $n_3$, where $n_0=00$, $n_1=01$, $n_2=10$ and $n_3=11$.

Thus, for the above example, by increasing the number of noise sequences L from two to four, the embedding rate is doubled. Generally as the value of L increases, the embedding procedure can have a higher embedding rate, because each noise sequence can now represent more data bits to be embedded at a time.

Each of the pseudo-random sequences in the set $\{n_0, n_1, \ldots n_{L-1}\}$ can be derived, for example, from a Gaussian random vector. The Gaussian random vector size can be, for example, a length of 1536 audio samples at 48 kHz, which translates to an embedding rate of 48000/1536 or 31.25 bps (bits per second). As noted above, to increase the embedding rate, an embedding procedure with more noise sequences can be used.

Turning now to the input audio signal, such signal is divided into multiple frames $x_i$ (703), each having a length audio_frame_len. By way of example and not of limitation, audio_frame_len can be 512 samples.

As shown in box (704), each frame of the input audio is multiplied by a window function of the same length as the frame (or audio_frame_len). By way of example, a Hanning window can be used. The window function according to the present disclosure can be derived from a Hanning window as follows:

$$w(i) = \frac{\sqrt{h(i)}}{\sqrt{h(i)^2 + h\left(i + \frac{\text{audio\_frame\_len}}{2}\right)^2}},$$

where $h(i)$ represents an $i^{th}$ Hanning window sample.

The windowed frame is then transformed (705) using, for example, a Modified Discrete Fourier Transform (MDFT). The transformed window frame can be represented as X, while the transform coefficients (or "bins") can be represented by $X_i$ as shown by the output of box (705). Several kinds of transformations can be used for the purposes of the present disclosure, such as a Fast Fourier Transform (FFT).

As shown in box (706), a masking curve comprised of coefficients $m_i$ is computed from the transform coefficients $x_i$. The masking curve comprises coefficients $m_i$, having a same dimensionality as the transform coefficients $X_i$ and specifies a maximum noise energy in decibel scale (dB) that can be added per bin without the noise energy being audible. In other words, if an added watermark signal's energy (represented by a pseudo-random noise sequence) is below the masking curve, the watermark is then inaudible.

In the embodiment of FIG. 7, transient detection (707) is also performed. Transients are short, sharp changes present in a frame which may disturb a steady-state operation of a filter. Statistically, transients do not occur frequently. However, if transients are detected (707) in an analyzed frame $x_i$, it is desirable not add any noise signal (708) to the audio frame because the added noise could be audible. If there are no transients, then the audio frame can be modified to include the noise sequence $n_i$ to be embedded.

Figure 8:
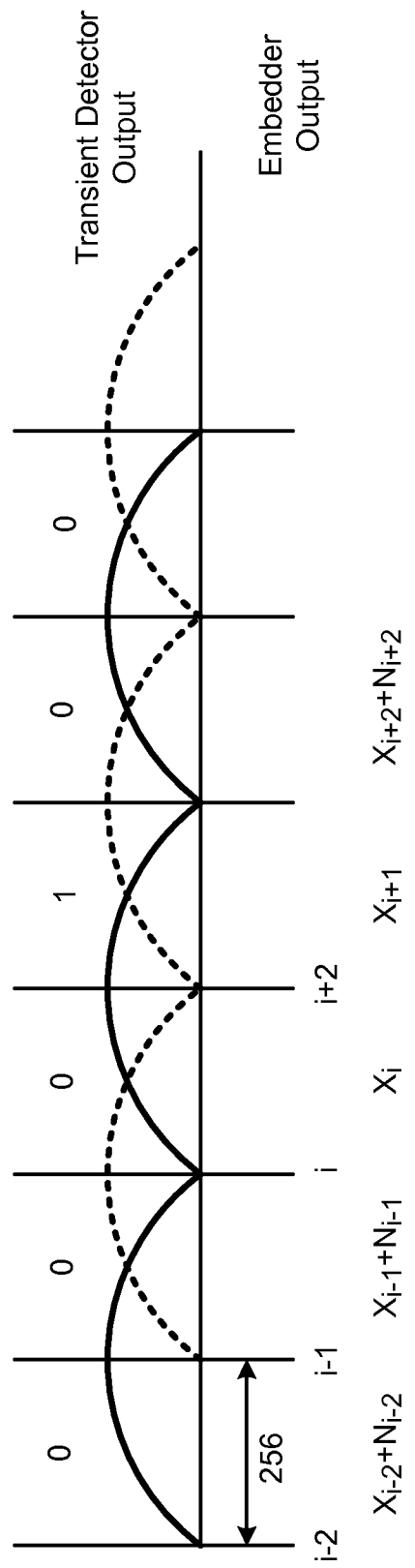
FIG. 8 shows an embedder behavior when detecting transients.

FIG. 8 shows an embedder behavior when detecting transients. As shown in FIG. 8, during the determination for transients, a whole frame (for example one that comprises of 512 samples) is divided into smaller windows, e.g., two windows of 256 samples for each frame. In particular, the first two windows of FIG. 8 refer to frame $X_{i-2}$ shown with a solid line, the second and third windows refer to frame $X_{i-1}$ shown with a dotted line, the third and fourth windows refer to frame $X_i$ shown with a solid line, and so on. In accordance with the embodiment shown in FIG. 8, an intra-frame control can be performed in order to decide when to add noise within a frame where a transient is not detected and not to add noise within a frame when a transient is detected. An intra-frame determination is more beneficial than making a determination of not adding noise to the whole frame if a transient is found in only one location of the whole frame.

If the transient detector's output is 1 in either half of a frame, noise embedding is turned off for that frame. For example, for frame $X_i$, FIG. 8 shows that the second half of the frame (i.e. the fourth window of FIG. 8) has a transient detector output of 1 and for frame $X_{i+1}$ the first half of the frame (the same fourth window) has a transient detector output of 1. In both of these frames, noise embedding is turned off. Therefore, when frames $X_i$ and $X_{i+1}$ are processed in the block (709) of FIG. 7, as later discussed, the shaped frequency spectrum of the pseudo-random noise sequence is not added to the frequency spectrum of the audio signal, differently from what occurs, for example, for frames $X_{i-2}$, $X_{i-1}$, and $X_{i+2}$ shown in FIG. 8.

Turning now to the description of FIG. 7, addition of the noise sequence $n_i$ to the frequency spectrum $X_i$ of the audio signal occurs in box (709). Within a noise adding step, a transform domain representation of a current noise frame (denoted as $N_i$) is obtained by windowing and performing a transform of the current noise frame in the time domain (denoted as $n_i$), similarly to what was shown in boxes (704) and (705) with reference to the audio signal. Afterwards, each bin $N_i$ of the noise sequence can be modulated in accordance with the coefficients $m_i$ of the masking curve (706). In particular, gain values (denoted as $g_i$) can be obtained and then applied as a multiplicative value for each bin of $N_i$ based on the masking curve as follows:

$$g_i = 10^{\frac{(m_i + \Delta)}{20}}.$$

Here, $\Delta$ can be used to vary a watermark signal strength to allow for trade-offs between robustness and audibility of the watermark.

Finally in the noise adding step, a modified transform coefficient (identified as $Y_i$) can be obtained where $Y_i = X_i + (g_i .* N_i)$. An operation .* represents element wise multiplication between the gain vector $g_i$ and the noise transform coefficients $N_i$. As already noted above, this step can be omitted if a transient is detected in a current frame $x_i$. In particular, in a case where a transient is detected, the modified transform coefficient $Y_i$ will be equivalent to $X_i$. Turning off embedding noise in presence of transients in a frame is useful, as it may allow, in some embodiments, to obtain a cleaner signal before the transient's attack. The presence of any noise preceding the transient's attack can be perceived by the human ear and hence can degrade the quality of watermarked audio.

Windowed time domain samples (indicated by IMDFT (710) and window (711)) are then overlapped and added (712) with a second half of a previous frame's samples to obtain output $y_i$ (713). Since in the embodiment of FIG. 7 frame $y_{i-1}$ and frame $y_i$ are both multiplied by the same window function, the trailing part of frame $y_{i-1}$'s window function overlaps with the starting part of the frame $y_i$'s window function. Since the window function is designed in such a way that the trailing part and the starting part add up to 1.0, the overlap add procedure of block (712) provides perfect reconstruction for the overlapping section of frame $y_{i-1}$ and frame $y_i$, assuming that both frames are not modified.

The outcome after the embedding procedure is a watermarked signal frame (denoted as $y_i$). Afterwards, a subsequent frame of audio samples is obtained by advancing the samples and then repeating the above operations.

Figure 9:
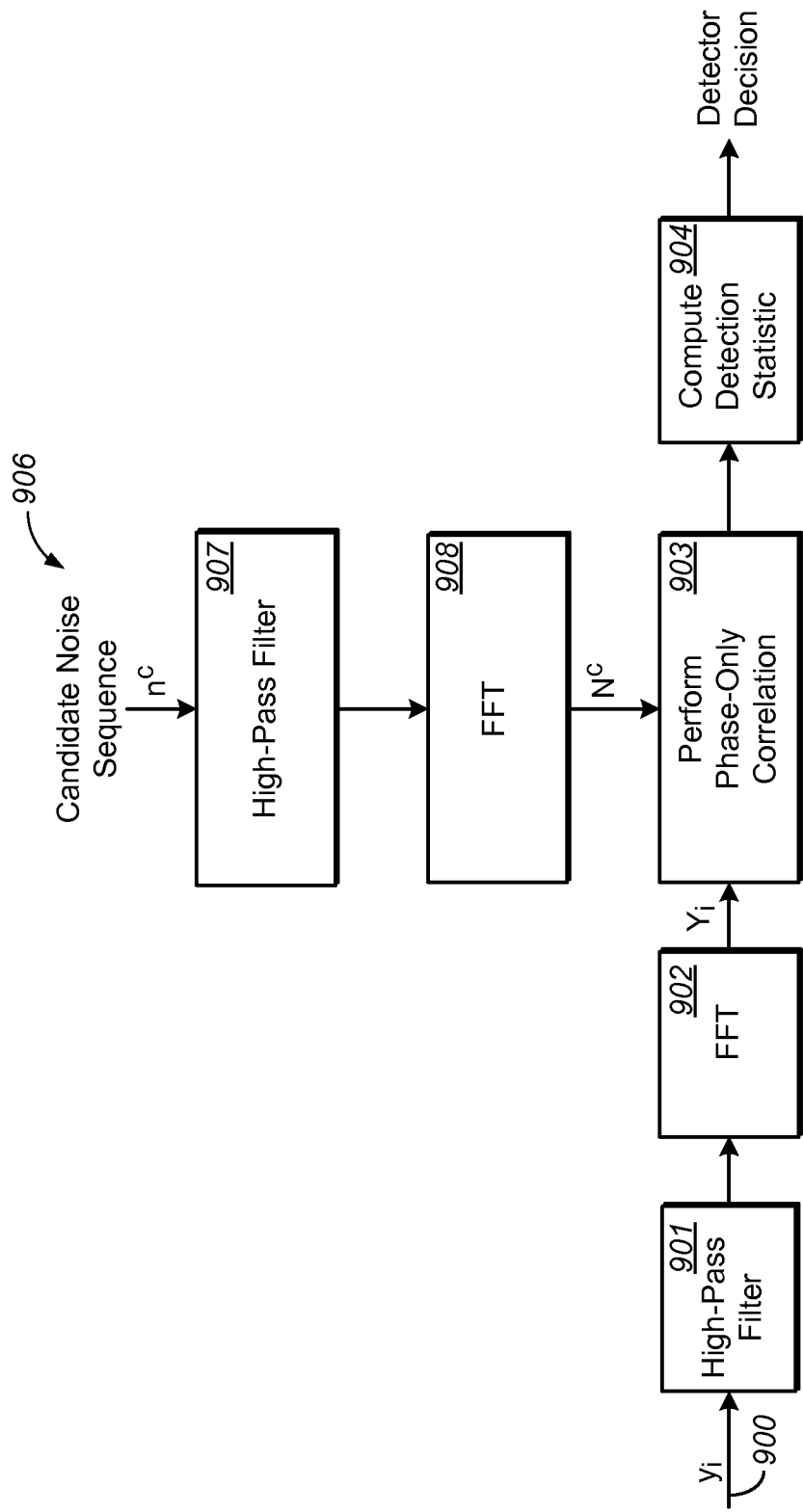
FIG. 9 shows a detection method or operational sequence in accordance with another embodiment of the present disclosure.

FIG. 9 shows a detection method or operational sequence in accordance with an embodiment of the present disclosure. The description of the embodiment of FIG. 9 will assume alignment between embedding and detection. Otherwise, a synchronization step can be used before performing the detection to make sure that alignment is satisfied. Several synchronization methods are known in the art and will not be elaborated upon herein.

An input watermarked signal is divided into non-overlapping frames $y_i$ (900), each having a length of, for example 1536 samples. The length of each frame corresponds to the length of each noise sequence previously embedded into the frame. A candidate noise sequence (906) to be detected within the input watermarked frame can be identified as $n^c$.

As shown by boxes (901) and (907), a high-pass filter is used on each audio frame sample $y_i$ and candidate noise sequence $n^c$, respectively. The high-pass filter improves a correlation score between the candidate noise sequence $n^c$ and the embedded noise sequence in the audio frame sample $y_i$.

As shown in boxes (902) and (908), a frequency domain representation of the time domain input audio frame $y_i$ and the candidate noise sequence $n^c$ is obtained, respectively using, for example, a Fast Fourier Transform (FFT). Each of the frequency domain representations $Y_i$ and $N^c$ have the same length.

As shown in box (903), phase-only correlation is performed between the frequency domain representations of the candidate noise sequence $N^c$ and the watermarked audio frame $Y_i$. To perform the phase-only correlation, first a spectrum of the input watermarked audio frame is whitened. A whitened spectrum of the watermarked input audio frame can be represented as $Y_i^w$ where $Y_i^w = \text{sign}(Y_i)$.

$Y_i$ is a vector of complex numbers and the operation "sign( )" of a complex number $a+ib$ divides the complex number by the magnitude of the complex number $$\left(\text{sign}(a+ib) = \frac{(a+ib)}{\sqrt{(a^2+b^2)}}\right).$$

By obtaining $Y_i^w$, the phase-only correlation can ignore the magnitude values in each frequency bin of the input audio frame while retaining phase information. The magnitude values in each frequency bin can be ignored because the magnitude values are all normalized. The phase-only correlation can be performed using the following expression:

$$\text{corr\_vals} = \text{IFFT}(\text{conj}(Y_i^w).*N^c).$$

Here, IFFT refers to an inverse fast Fourier transform. conj refers to a complex conjugate of $Y_i^w$. corr_vals can be rearranged so that the correlation value at zero-lag is at a center.

The phase-only correlation can also square each element in corr_vals vector so that the corr_vals vector can be positive.

In a further step of the detection method shown in FIG. 9, a detection statistic is computed (904) from the squared re-arranged correlation value vector. In a first step to compute the detection statistic, the squared rearranged correlation value vector is processed through a low-pass filter to obtain a filtered correlation value (filtered_corr_vals) vector.

In a second step to compute the detection statistic, a difference between a maximum of the filtered corr_vals in two ranges (range1 and range2) is computed. Range1 refers to indices where a correlation peak can be expected to appear. Range2 refers to the indices where the correlation peak cannot be expected to appear. In an embodiment of the present disclosure, range1 can be a vector with indices between 750 and 800 while range2 can be a vector with indices between 300 and 650.

$$\text{detection\_statistic} = \max(\text{filtered\_corr\_vals}(\text{range1})) - \max(\text{filtered\_corr\_vals}(\text{range2}))$$

As disclosed above with reference to the diagram of FIG. 7, to increase the embedding rate, a set of L pseudo-random sequences $\{n_0, n_1, \ldots n_{L-1}\}$ can be used, where each noise sequence represents $\log_2 L$ bits of the data bits to embed in the audio signal. For example, 16 noise sequences can represent four data bits by embedding one noise sequence. However, at a detector, the embodiment would have to perform 16 correlation computations as described in a following equation:

$$\text{corr\_vals} = \text{IFFT}(\text{conj}(Y_i^w).*N^c).$$

Here, $N^c$ is the transform of the candidate noise sequence, which could be one of the 16 noise sequences to be detected. The correlation computation can be repeated up to 16 times as the detector attempts to identify the embedded noise sequence.

In an embodiment of the present disclosure, a correlation detection method to perform detection with a single correlation computation irrespective of a number of candidate noise sequences to be detected is presented. In a first step of the correlation detection method, each unmultiplexed code is circularly shifted by a specific shift amount to obtain another set of noise sequences. A new set of shifted noise sequences can be identified as $\{<n_0>_{s0}, <n_1>_{s1}, \ldots <N_{L-1}>_{sL-1}\}$. $<n_0>_{s0}$ refers to a circularly shifted noise sequence $n_0$ by an amount of $s_0$. An example of $s_i$ values for a 16 candidate noise sequence can be as follows: $s_0=0$, $s_1=64$, $s_2=128 \ldots s_{15}=960$.

In a second step of the correlation detection method, multiplexed codes are obtained by summing the elements of the above set. The multiplexed codes are identified as $n_{a11} = <n_0>_{s0} + <n_1>_{s1} + \ldots + <N_{L-1}>_{sL-1}$.

In a third step of the correlation detection method, the phase-only correlation computation already described with reference to box (903) of FIG. 9 is performed. The correlation computation can be described as follows:

$$\text{corr\_vals} = \text{IFFT}(\text{conj}(Y_i^w).*N^c).$$

Since an unshifted noise sequence is embedded into the audio signal and is correlated with a summation of circularly shifted noise sequences $n_{a11}$, a location of the correlation peak encodes information about the unshifted noise sequence embedded in the audio signal. The embedded noise sequence in the audio signal can be identified as $n_i$. A correlation can be described as follows:

$$\operatorname{corr}(n_{all}, n_i) = \operatorname{corr}(\langle n_0 \rangle s_o, n_i) + \operatorname{corr}(\langle n_1 \rangle s_1, n_i) +$$
$$\ldots \operatorname{corr}(\langle n_i \rangle s_i, n_i) + \ldots \operatorname{corr}(\langle n_{L-1} \rangle s_{L-1}, n_i) = \operatorname{corr}(\langle ni \rangle s_i, n_i).$$

It should be noted that $\operatorname{corr}(n_{a11}, n_i) = \operatorname{corr}(\langle ni \rangle s_i, n_i)$ as all other correlation terms tend to zero meaning a correlation peak shifted by $s_i$ can be expected.

As long as the correlation peaks are not too close, then it would be possible to identify a peak associated for a particular candidate noise sequence based on the known shift amount. It could happen, through inclusion of all the candidate noise sequences in one correlation computation that the peaks would end up crowding making a particular peak indistinguishable from adjacent peaks. Thus in an embodiment, breaking down the number of candidate noise sequences into subsets of unmultiplexed noise sequences to be done in a single correlation computation by combining such subsets into sets of multiplexed noise sequences may be desired so that the peaks are distinguishable from each other. Although multiple correlation computations may still be needed to determine all the candidate noise sequences, this embodiment still simplifies the complexity by requiring less computations to be done overall in comparison to doing one computation for each candidate noise sequence individually.

Figure 10:
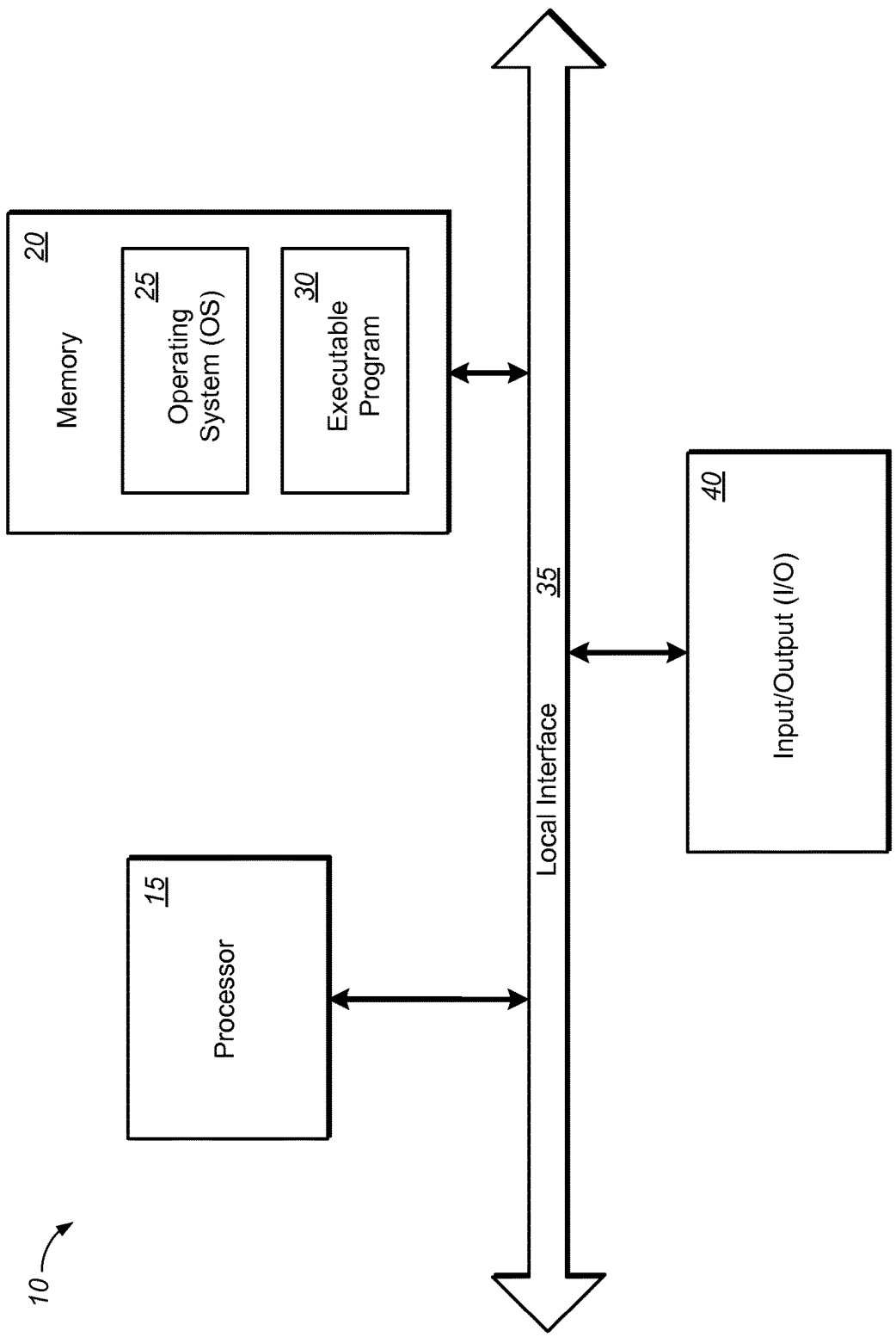
FIG. 10 shows a computer system that may be used to implement the various embodiments described herein.

FIG. 10 shows a computer system (10) that may be used to implement the various embodiments described herein. It should be understood that certain elements may be additionally incorporated into computer system (10) and that the figure only shows certain basic elements (illustrated in the form of functional blocks). These functional blocks include a processor (15), memory (20), and one or more input and/or output (I/O) devices (40) (or peripherals) that are communicatively coupled via a local interface (35). The local interface (35) can be, for example, metal tracks on a printed circuit board, or any other forms of wired, wireless, and/or optical connection media. Furthermore, the local interface (35) is a symbolic representation of several elements such as controllers, buffers (caches), drivers, repeaters, and receivers that are generally directed at providing address, control, and/or data connections between multiple elements.

The processor (15) is a hardware device for executing software, more particularly, software stored in memory (20). The processor (15) can be any commercially available processor or a custom-built device. Examples of suitable commercially available microprocessors include processors manufactured by companies such as Intel, AMD, and Motorola.

The memory (20) can include any type of one or more volatile memory elements (e.g., random access memory (RAM, such as DRAM, SRAM, SDRAM, etc.)) and non-volatile memory elements (e.g., ROM, hard drive, tape, CDROM, etc.). The memory elements may incorporate electronic, magnetic, optical, and/or other types of storage technology. It must be understood that the memory (20) can be implemented as a single device or as a number of devices arranged in a distributed structure, wherein various memory components are situated remote from one another, but each accessible, directly or indirectly, by the processor (15).

The software in memory (20) may include one or more separate programs, each of which comprises an ordered listing of executable instructions for implementing logical functions. In the example of FIG. 11, the software in the memory (20) includes an executable program (30) that can be executed to implement the audio data spread spectrum embedding and detection system in accordance with the present disclosure. Memory (20) further includes a suitable operating system (OS) (25). The OS (25) can be an operating system that is used in various types of commercially-available devices such as, for example, a personal computer running a Windows® OS, an Apple® product running an Apple-related OS, or an Android OS running in a smart phone. The operating system (20) essentially controls the execution of executable program (30) and also the execution of other computer programs, such as those providing scheduling, input-output control, file and data management, memory management, and communication control and related services.

Executable program (30) is a source program, executable program (object code), script, or any other entity comprising a set of instructions to be executed in order to perform a functionality. When a source program, then the program may be translated via a compiler, assembler, interpreter, or the like, and may or may not also be included within the memory (20), so as to operate properly in connection with the OS (25).

The I/O devices (40) may include input devices, for example but not limited to, a keyboard, mouse, scanner, microphone, etc. Furthermore, the I/O devices (40) may also include output devices, for example but not limited to, a printer and/or a display. Finally, the I/O devices (40) may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer system (10) is a PC, workstation, or the like, the software in the memory (20) may further include a basic input output system (BIOS) (omitted for simplicity). The BIOS is a set of essential software routines that initialize and test hardware at startup, start the OS (25), and support the transfer of data among the hardware devices. The BIOS is stored in ROM so that the BIOS can be executed when the computer system (10) is activated.

When the computer system (10) is in operation, the processor (15) is configured to execute software stored within the memory (20), to communicate data to and from the memory (20), and to generally control operations of the computer system (10) pursuant to the software. The audio data spread spectrum embedding and detection system and the OS (25), in whole or in part, but typically the latter, are read by the processor (15), perhaps buffered within the processor (15), and then executed.

When the various embodiments described herein are implemented in software, it should be noted that the software can be stored on any computer readable storage medium for use by, or in connection with, any computer related system or method. In the context of this document, a computer readable storage medium is an electronic, magnetic, optical, or other physical device or means that can contain or store a computer program for use by, or in connection with, a computer related system or method.

The various embodiments described herein can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any non-transitory tangible means that can store, communicate, propagate, or transport the program for use by or in connection with the instruction execution system, apparatus, or device. The computer readable storage medium can be, for example but not limited to, an electronic, magnetic, optical, electromagnetic, infrared, or semiconductor system, apparatus, or device. More specific examples (a non-exhaustive list) of the computer-readable storage medium would include the following: a portable computer diskette, a random access memory (RAM), a read-only memory (ROM), an erasable programmable read-only memory (EPROM, EEPROM, or Flash memory) an optical disk such as a DVD or a CD.

In an alternative embodiment, where the various embodiments described herein are implemented in hardware, the hardware can implemented with any one, or a combination, of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The examples set forth above are provided to give those of ordinary skill in the art a complete disclosure and description of how to make and use the various embodiments described herein, and are not intended to limit the scope of what the inventors regard as their disclosure. Modifications of the above-described modes for carrying out the disclosure can be used by persons of skill in the art, and are intended to be within the scope of the following claims.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

What is claimed is:

1. A method of detecting a synchronization code word embedded in an input watermarked audio signal, the input watermarked audio signal comprising a plurality of signal frames, the synchronization code word containing "s" number of bits transmitted in a unique pre-defined sequence, the method comprising:

selecting a first sampling rate "r1" that is based on partitioning each signal frame of the input watermarked audio signal into "n" segments;
using the sampling rate "r1" to sequentially extract "n" candidate bits from each frame of "s" frames of the input watermarked audio signal;
storing the "s*n" candidate bits in a first bit buffer;
using the stored "s*n" candidate bits to execute a first correlation-based detection procedure to identify a best-fit segment among the "n" segments, the first correlation-based detection procedure comprising:
   computing a first set of correlation scores by comparing "n" number of s-bit combinations to the pre-defined synchronization code word;
   using the first set of correlation scores to select a first peak s-bit combination; and
   using the first peak s-bit combination to identify the first best-fit segment among the "n" segments;
executing a segmentation-based detection procedure that is initiated from the first best-fit segment, the segmentation-based detection procedure comprising:
   selecting a second sampling rate "r2" that is based on partitioning the first best-fit segment into "p" segments;
   using the second sampling rate "r2" to sequentially extract ("p−1") candidate bits from each frame of "s" frames of the input watermarked audio signal;
   storing the "s*(p−1)" candidate bits in a second bit buffer; and
   using the contents of the first and the second buffer to execute a second correlation-based detection to identify a second best-fit segment among the "p" sub-segments, wherein the second correlation-based detection procedure is substantially similar to the first correlation-based detection procedure;
   using the second best-fit segment to initiate a recursive execution of the segmentation-based detection procedure to identify the synchronization code word amongst successively smaller portions of the second best-fit segment.

2. The method of claim 1, wherein the sampling rate "r1" is defined as "(N/n)," and the sampling rate "r2" is defined as "(N/p*n)," where "N" is a total number of samples contained in each signal frame of the input watermarked audio signal.

3. The method of claim 2, wherein "n" is an integer value that is selected on the basis of a computational complexity factor of a receiver.

4. The method of claim 3, wherein the computational complexity factor is defined, at least in part, by "n*s".

5. The method of claim 4, wherein "p" is equal to 2.

6. The method of claim 1, wherein sequentially extracting "n" candidate bits from each frame of "s" frames of the input watermarked audio signal comprises extracting each of the "n" candidate bits from an identical location in each of the "s" frames of the input watermarked audio signal.

7. The method of claim 1, wherein sequentially extracting "n" candidate bits from each frame of "s" frames of the input watermarked audio signal comprises extracting at least one of the "n" candidate bits from a first location in a first frame of the input watermarked audio signal and extracting at least another of the "n" candidate bits from a second location in a second frame of the input watermarked audio signal, wherein the first location is different than the second location.

8. A method of detecting a synchronization code word containing "s" bits, the synchronization code word embedded one bit per frame in "s" frames of an input watermarked audio signal, the method comprising:

initiating a first segmentation procedure comprising defining of "n" segments in each signal frame of the input watermarked audio signal;

using a first correlation threshold value based on the synchronization code word, to identify in the "n" segments, a first segment having the highest likelihood of containing at least a portion of the synchronization code word; and initiating from the first segment, a recursive detection procedure incorporating one or more additional segmentation procedures and one or more additional correlation threshold values, to detect the synchronization code word in a sub-divided portion of the first segment.

9. The method of claim 8, wherein "n" is an integer greater than 2.

10. The method of claim 9, wherein each of the one or more additional segmentation procedures comprises defining two segments in each sub-divided portion of the first segment.

11. The method of claim 9, wherein each of the one or more additional segmentation procedures comprises defining more than two segments in each sub-divided portion of the first segment.

12. A method of detecting a synchronization code word containing "s" bits, the synchronization code word embedded one bit per frame in "s" frames of an input signal, the method comprising:

generating the input signal, the generating comprising:
selecting a pseudo-random sequence according to the synchronization code word;
shaping a frequency spectrum of the pseudo-random sequence with a frequency spectrum of an audio signal, thus forming a shaped frequency spectrum of the pseudo-random noise sequence; and
subtracting the shaped frequency spectrum of the pseudo-random sequence from the frequency spectrum of the audio signal spectrum;

initiating a first segmentation procedure comprising defining of "n" segments in each signal frame of the input watermarked audio signal;

using a first correlation threshold value based on the synchronization code word, to identify in the "n" segments, a first segment having the highest likelihood of containing at least a portion of the synchronization code word; and initiating from the first segment, a recursive detection procedure incorporating one or more additional segmentation procedures and one or more additional correlation threshold values, to detect the synchronization code word in a sub-divided portion of the first segment.

13. The method of claim 12, wherein "n" is an integer greater than 2.

14. The method of claim 12, wherein each of the one or more additional segmentation procedures comprises defining two segments in each sub-divided portion of the first segment.

15. The method of claim 12, wherein each of the one or more additional segmentation procedures comprises defining more than two segments in each sub-divided portion of the first segment.

16. The method according to claim 12, wherein the selected pseudo-random sequence is a function of pseudo-random chip sequences of $\{+1, -1\}$.

17. The method according to claim 12, wherein the frequency spectrum of the pseudo-random sequence comprises of frequency coefficients different from zero only in a desired frequency range.

18. The method according to claim 12, wherein the shaping and subtracting steps occur on an audio frame by audio frame basis.

19. The method according to claim 18, wherein the desired frequency range is between 2 kHz to 7.5 kHz.

20. The method according to claim 19, wherein the selecting, shaping and subtracting steps for a specific data are repeated for a set number of audio frames.

21. The method according to claim 20, wherein the set number of audio frames is three audio frames.

22. The method of claim 12, further comprising:
generating the input signal, the generating comprising:
selecting a pseudo-random sequence according to the synchronization code word;
computing a masking curve based on an audio signal;
shaping a frequency spectrum of the pseudo-random sequence in accordance with the masking curve, thus obtaining a shaped frequency spectrum of the pseudo-random noise sequence;
adding the shaped frequency spectrum of the pseudo-random noise sequence to a frequency spectrum of the audio signal, the adding occurring on an audio signal frame by audio signal frame basis; and
detecting, for audio signal frames, presence or absence of transients, wherein, for audio signal frames for which presence of a transient is detected, the shaped frequency spectrum of the pseudo-random noise sequence is not added to the frequency spectrum of the audio signal.

23. The method of claim 22, wherein the pseudo-random sequence is selected from a plurality of concatenated pseudo-random sequences according to the data bits to be embedded.

24. The method of claim 23, wherein the number of concatenated pseudo-random sequences (L) is a function of the number of bits (B) representing the data to be embedded in the audio signal.

25. The method of claim 24, wherein $B=\log_2 L$.

26. A computer-readable storage medium having stored thereon non-transitory computer-executable instructions executable by a processor to detect a synchronization code word containing "s" bits, the synchronization code word embedded one bit per frame in "s" frames of an input watermarked audio signal, the detection comprising:

initiating a first segmentation procedure comprising defining of "n" segments in each signal frame of the input watermarked audio signal;

using a first correlation threshold value based on the synchronization code word, to identify in the "n" segments, a first segment having the highest likelihood of containing at least a portion of the synchronization code word; and initiating from the first segment, a recursive detection procedure incorporating one or more additional segmentation procedures and one or more additional correlation threshold values, to detect the synchronization code word in a sub-divided portion of the first segment.

* * * * *